March 22, 1966  F. E. OBERMAIER  3,241,759
THERMOSTATIC VALVE

Filed May 11, 1964  2 Sheets-Sheet 1

INVENTOR.
Frank E. Obermaier
BY
*Hill, Sherman, Meroni, Gross & Simpson*
ATTORNEYS INVENTOR.
Frank E. Obermaier United States Patent Office 3,241,759
Patented Mar. 22, 1966

3,241,759
THERMOSTATIC VALVE
Frank E. Obermaier, Park Ridge, Ill., assignor to The Dole Valve Company, Morton Grove, Ill., a corporation of Illinois
Filed May 11, 1964, Ser. No. 366,233
7 Claims. (Cl. 236—34)

This invention relates generally to fluid flow control valves and more particularly relates to a thermostatic valve operative to control the flow of fluid through a conduit in response to the temperature of the fluid on the upstream side of the valve.

Thermostatic valves are often employed in controlling the flow of fluid through conduits where the flow rate through the conduit is a function of the temperature of the fluid. For example, in an automobile cooling system, a thermostatic valve is generally utilized in the coolant line between the motor block and the radiator to control the flow of coolant into the radiator in response to the temperature of the coolant.

In the prior art such valves often incorporate a valve member operated by means of a temperature-sensitive power unit and engageable with a valve seat to control flow through a port and it is conventional practice to dispose the valve member on the upstream side of the valve seat to utilize the upstream pressure of the coolant in seating the valve member.

As a result of such disposition, initial unseating of the valve member generally requires a greater force and a more powerful power unit. For example, in the case of an automobile cooling system, the thermostatic valve in the coolant line should remain closed until the temperature of the coolant in the line has increased to a predetermined level. Before this increase in temperature occurs, however, the automobile engine, and concomitantly the coolant circulating pump, may be operating at a relatively high speed, thereby producing a relatively high fluid pressure head on the upstream side of the valve member which must be overcome before the valve member can initially unseat.

In accordance with the principles of the present invention, the problem of initial unseating of the valve member has been substantially reduced. In addition to the main valve member, the size of which is relatively large, a by-pass valve member of much smaller size is provided, the necessary initial unseating force for which is appreciably less than that required for the main valve member. Once the by-pass valve member has opened, and flow is established through the thermostatic valve, the pressure differential between upstream and downstream sides of the valve is reduced, thereby reducing the force required to initially unseat the main valve member.

In addition, due to a novel arrangement of the valve, only a single power unit is required to operate both the by-pass valve member and the main valve member.

It is, therefore, an object of the present invention to provide a thermostatic valve for controlling fluid flow in a conduit whereby the force required for initial opening of the valve against the opposing bias of upstream fluid pressure is reduced.

Another object is to provide, in a thermostatic valve having a main valve member disposed on the upstream side of the valve body, means to reduce the force required to effect initial opening of the main valve member.

Another object of the invention resides in the provision, in a thermostatic valve having a valve member on the upstream side of the valve and incorporating a temperature-sensitive power unit to operate the valve member, of means to reduce the power requirements of the power unit, particularly as respects the power requirements for initial opening of the valve.

A still further object of the invention is to provide a thermostat wherein a small valve member opens a relatively large port area per unit movement of the power unit piston to help obviate valve malfunction resulting from particle entrapment between the valve member and its seat.

Many features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Figure 1:
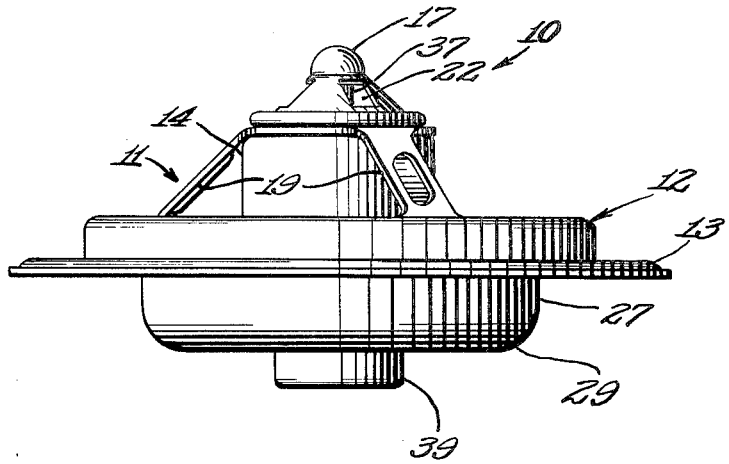
FIGURE 1 is a side elevational view of a thermostatic valve incorporating the principles of the present invention.

Although the principles of the present invention are of utility in any fluid flow control valve, a particularly useful application is made to valves which control fluid flow therethrough as a function of the temperature of the fluid, and an illustrative embodiment herein shown consists of a thermostatic valve of the type generally employed in the cooling system of an automobile and indicated generally in the drawings at reference numeral 10.

The valve 10 is primarily intended for mounting in a fluid conduit, coolant line or the like in order to control the flow of fluid through such conduit, and in order to provide mounting means for the valve as well as to provide a valve porting arrangement, the valve 10 includes a wall piece 11 constructed such as to be disposed within the conduit and to extend substantially transversely to the direction of fluid flow through the conduit.

Figure 2:
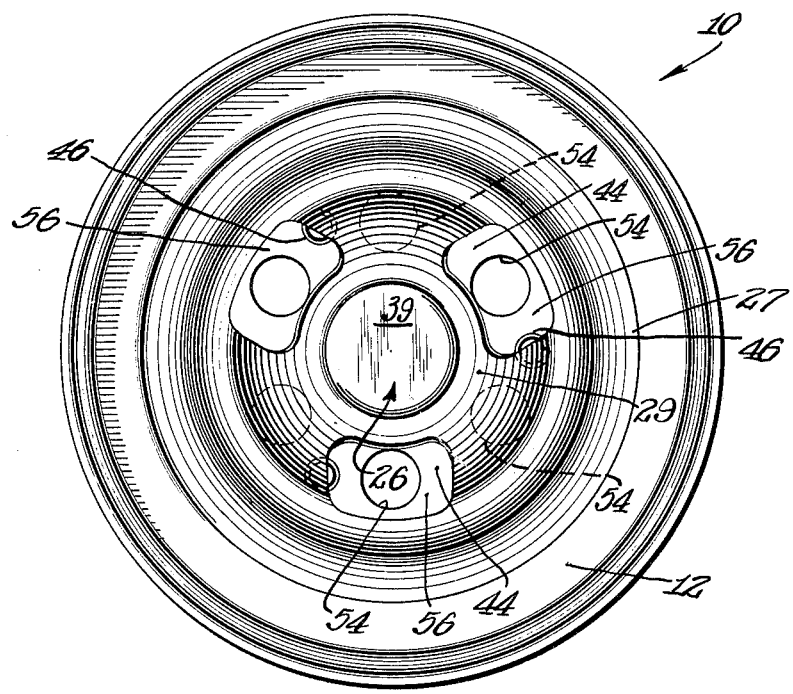
FIGURE 2 is a bottom view of the valve of FIGURE 1.
Figure 3:
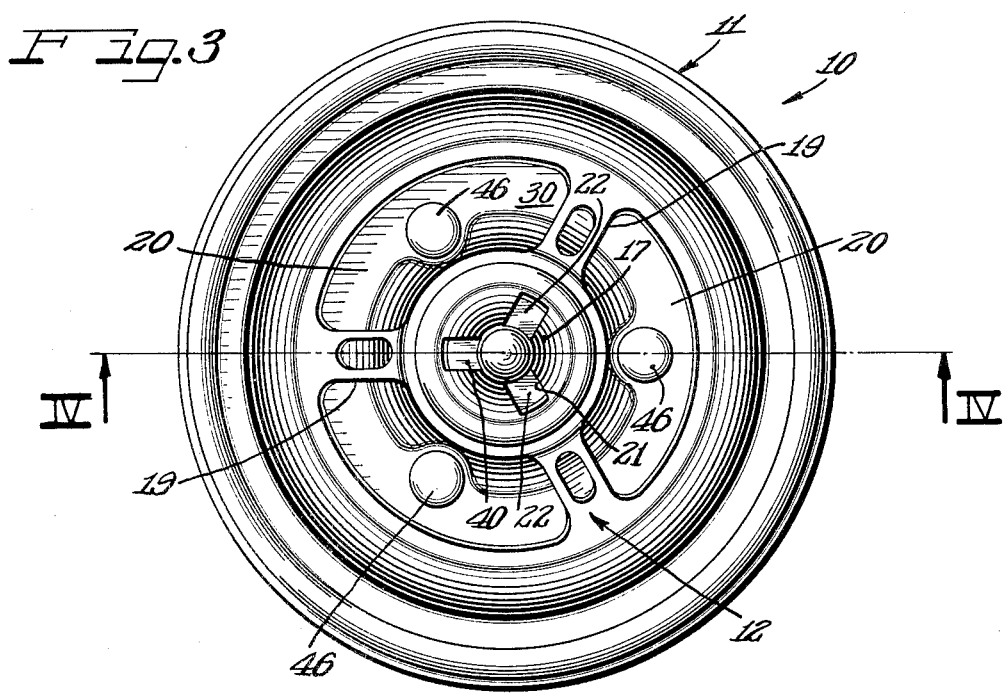
FIGURE 3 is a top plan view of the valve of FIGURE 1.
Figure 4:
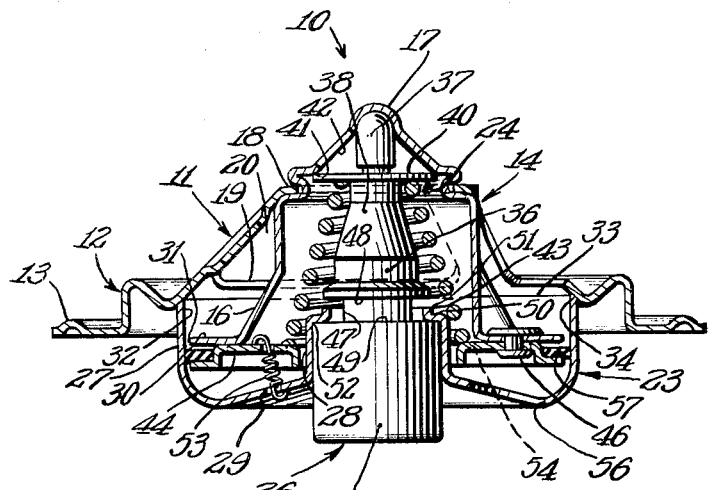
FIGURE 4 is a vertical sectional view taken substantially along lines IV—IV of FIGURE 3 with parts shown in elevation.

In plan view, as shown in FIGURES 2 and 3, the valve 10 assumes a generally circular configuration and in side view, as shown particularly in FIGURES 1 and 4, the valve 10 and more particularly the wall-piece 11 assumes a somewhat conical shape.

In its installed position within a conduit, the direction of fluid flow across the valve is from the base or open end of the conically-shaped wall-piece 11 to the apex thereof, i.e., from bottom to top as the valve is shown in FIGURE 4.

The wall-piece 11 is more particularly characterized as comprising a mounting plate 12 having a bead 13 formed adjacent the periphery thereof in order to facilitate mounting of the valve in a conduit, and a valve guide member 14 which may also be referred to as a flow path separation member for reasons more apparent hereinafter. The guide member 14 comprises a generally cylindrical body portion 16 having a longitudinal axis arranged coaxially with respect to the central axis of the entire valve assembly.

A closed end portion 17 of the guide member body 16 forms a tapered stirrup and further constitutes the apex of the conically shaped overall configuration of the valve. The guide member 16 and the mounting plate 12 are connected together in fixed assembly at the base of the stirrup 17 by any suitable means, as for example, press-fitted flange and groove means as at 18.

For ease in describing the valve 10, those portions of the valve situated below the mounting plate 12 and the stirrup 17 as viewed in FIGURE 4 will be referred to as being located "up-stream" of the valve, and the area above the valve will be referred to as "down-stream" of the valve. "On-stream direction" of the fluid flow through the valve will be used to connote a direction of fluid flow parallel to the central axis of the valve.

The mounting plate 12 is apertured as at 19, as best illustrated in FIGURE 3, to provide a plurality of openings as at 20. The stirrup 17 is apertured as at 21 to provide a plurality of openings as at 22.

A main cup-shaped valve member indicated generally at reference numeral 23 is disposed up-stream of the mounting plate 12 and a by-pass valve member 24 is disposed up-stream of the stirrup 17, and both the main valve member 23 and the by-pass valve member 24 are actuated by an elongated temperature-sensitive power unit 26 having a longitudinal axis extending coaxially with the central axis of the valve 10.

The main valve member 23 more particularly comprises an outer cylindrical wall 27 and an inner cylindrical wall 28, both of which extend substantially in an "on-stream" direction and both of which are joined at their bottom ends by means of a bottom end wall 29.

The main valve member 23 is guided for axial reciprocal movement by means of a radially outwardly extending generally annularly-shaped guide flange 30 formed at the lowermost end of the valve guide member 14 and having an outer peripheral edge 31 dimensioned to slidingly engage an inner surface 32 of the outer cylindrical wall 27.

An upper edge 33 of the outer cylindrical wall 27 is shaped complementarily to an inner surface 34 of the mounting plate 12. Such surface 34, which is in register with the valve edge 33, constitutes a valve seat for the main valve member 23 and also defines a main valve port, the radial outer boundary of which is defined by the valve seat 34.

The illustrated embodiment of the temperature-sensitive power unit 26 is of a conventional type and comprises a body or casing 36 and a power or pin member 37 axially telescopically extensible from the casing 36. That portion of the casing 36 indicated at reference numeral 38 includes a pin member guide for receiving the pin member 37 and has formed therein a bore (not shown) which extends axially through the casing 36 to an exposed or sensing portion indicated at 39 which, as will be appreciated, is exposed to the temperature of the fluid in the conduit on the up-stream side of the valve.

A given quantity of suitable material such as wax which is expansible in response to temperature increase is carried in the bore at the closed end thereof to force the pin member 37 telescopically outwardly from the casing 36 upon an increase in temperature ambient the exposed portion 39.

As illustrated, the pin member 37 is received in abutting engagement by the stirrup 17 and the lower or sensing portion of the casing is slidably received by the inner cylindrical wall 28 of the main valve member 23 in order to ensure alignment of the longitudinal axis of the power unit 26 with the central axis of the valve 10.

The by-pass valve member 24 is securely mounted on the casing 36 for movement therewith and comprises a radially extending face 40 in axial registry and engageable with a complementarily shaped portion 41 of an inner surface 42 of the stirrup 17, such portion 41 constituting a valve seat for the by-pass valve member 24 and defining the outer peripheral boundary of a by-pass port.

The power unit casing 36 is urged upwardly (as viewed in FIGURE 4) to a retracted position whereby the by-pass valve member 24 is seated on the valve seat 41 by means of a suitable biasing means such as a helically wound coil spring indicated at 43. The spring 43 bottoms at the top end thereof on the by-pass member 24 and at the lower end thereof on an annularly shaped radially extending bracket or collar 44 which is firmly affixed to the flange portion 30 of the valve guide member 14 by means of a plurality of fasteners such as rivets as indicated at 46.

In its fully retracted position as illustrated in FIGURE 4 it is contemplated that the casing 36 will maintain not only the by-pass valve member 24, but also the main valve member 23 in a closed or seated position. For that purpose a groove 47 is formed in the casing 36 to define a pair of radially extending abutment walls or shoulder surfaces 48 and 49 facing up-stream and down-stream, respectively. A circumferentially continuous radially inwardly inclined lip 50 is formed at the upper end of the inner cylindrical wall 28 to provide a pair of axially spaced abutment walls or surfaces 51 and 52 which are in registry and engageable with abutment walls 48 and 49, respectively. It will be noted that the axial distance between abutment walls 48 and 49 is greater than the axial distance between abutment walls 51 and 52 by a given amount, such amount representing "play" or lost-motion between the casing 36 and the main valve member 23.

In the retracted position of the casing 36, the abutment wall 49 of the casing engages the corresponding abutment surface 52 of the main valve member 23, which is in the line of travel of the wall 49, thereby urging the main valve member 23 into seating engagement with its valve seat simultaneously with the seating of the by-pass valve member 24. Generally, upon seating of the main valve member 23, fluid pressure on the up-stream side of the valve is sufficient to maintain the valve member in a seated position, but in order to ensure such continued seating of the valve member suitable biasing means such as a spring member 53 can be provided to interconnect the wall piece 11 and the valve member 23 via the valve guide member 14, thereby providing a seating bias to the valve member 23.

Assume that the power unit 26 is in its retracted position as illustrated in FIGURE 4, due to the relatively reduced temperature of the fluid ambient the sensing portion 39. Upon an increase in fluid temperature up-stream of the valve, the valve 41 should thereupon open to allow the fluid to flow therethrough.

An increase in temperature of the fluid surrounding the sensing portion 39 will cause the casing 36 of the power unit to move axially extensibly away from the pin member 37 and to thereby open or unseat the main valve member 23. It will be appreciated, however, that because of the relatively large size of the main valve member, the initial "cracking" or unseating of this valve will necessitate the use of a large power unit, particularly when the pressure of the fluid on the up-stream side of the valve is substantially greater than that on the down-stream side of the valve.

In order to reduce the force required to open the main valve member 23, in accordance with the principles of the invention, the by-pass port and by-pass valve member 24 are situated in a flow path communicating the up-stream and down-stream sides of the valve and defined generally by the apertures 22 formed in the stirrup 17, the body wall 16 of the valve guide member 14, a plurality of apertures as indicated at 54 formed in the bracket 44 and a plurality of apertures 56 formed in the end wall 29 of the main valve member 23. Such flow path is distinct from a second flow path through the valve defined substantially by the outer surface of the outer cylindrical wall 27 of the valve member 23, the main port defined by the valve seat 34 and the apertures or openings 20 formed in the mounting plate 12, and separated in leak-proof relation therewith by means of a suitable sealing member such as an "O" ring 57 confined between the flange 30 and the bracket 44 to slidably abut the inner surface 32 of the outer cylindrical wall 27.

Upon an increase in temperature ambient the sensing portion 39 of the power unit 26, the casing 36 will begin to move in an up-stream direction away from the pin member 37, and this initial movement of the casing 36 will unseat the by-pass valve member 24 to open the by-pass port, but will not effect opening of the main valve member 23. It is apparent that because of the reduced size of the by-pass valve member 24 with respect to the main valve member 23, initial "cracking" of the by-pass valve member requires much less force than that which would be required to open main valve member 23.

The main valve member 23 will not, in fact, become unseated until the casing has moved sufficiently in an upstream direction such that the abutment wall 48 thereof engages the complemental abutment wall 51 of the main valve member. Before this occurs, however, a first flow path across the valve has already been established through the by-pass port such as to substantially decrease the pressure differential of the fluid across the valve, thereby necessitating a greatly reduced force to open the main valve member 23.

Upon subsequent reduction in the temperature ambient the sensing portion 39, the casing 36 will move from its extended position back to its retracted position, and the main valve member and the by-pass valve member will close or seat simultaneously.

It will be appreciated that the amount by which the by-pass port is open prior to the initial opening of the main port is determined by the axial distance between the opposed abutment walls 48 and 51 of the casing 36 and the main valve member 23 when the casing is in its retracted position as illustrated in FIGURE 4.

As a result of such premature opening of a smaller by-pass port before the initial opening of the relatively large main port, the power requirements of the temperature-sensitive power unit 26 are substantially reduced and better, more accurate control of flow through the valve is achieved.

Although minor modifications might be suggested by those versed in the art, it should be understood that I wish to embody within the scope of the patent warranted hereon all such modifications as reasonably come within the scope of my contribution to the art.

I claim as my invention:

1. A valve for controlling fluid flow in a conduit comprising,
   a wall-piece adapted to be mounted in the conduit substantially transversely to the direction of flow therethrough,
   first and second ports including valve seats formed in said wall piece,
   a temperature-sensitive power unit including a pin member abutting said wall piece and a casing exposed to the fluid and movable with respect to said pin member between retracted and extended positions in response to temperature ambient said casing,
   a first valve member fixedly connected to said casing and engageable with the valve seat of said first port only in the retracted position of said casing,
   biasing means urging said casing toward its retracted position,
   a second valve member slidably carried on said casing and engageable with the valve seat of said second port,
   a pair of abutment surfaces formed respectively on said casing and on said second valve member and disposed in mutually spaced relation when said casing is in its retracted position and engageable with one another when said casing has moved a given distance toward its extended position to unseat said second valve member from said second port valve seat.

2. A valve for controlling fluid flow in a conduit comprising,
   a wall-piece adapted to be mounted in the conduit substantially transversely to the direction of flow therethrough,
   first and second ports including valve seats formed in said wall piece,
   a temperature-sensitive power unit including a pin member abutting said wall piece and a casing exposed to the fluid and movable with respect to said pin member between retracted and extended positions in response to temperature ambient said casing,
   a first valve member fixedly connected to said casing and engageable with the valve seat of said first port only in the retracted position of said casing, biasing means urging said casing toward its retracted position,
   a second valve member slidably carried on said casing and engageable with the valve seat of said second port,
   a pair of abutment surfaces formed respectively on said casing and on said second valve member and disposed in mutually spaced relation when said casing is in its retracted position and engageable with one another when said casing has moved a given distance toward its extended position to unseat said second valve member from said second port valve seat, and stop means formed on said casing and on said second valve member cooperating with said abutment surfaces to limit the extent of axial movement of said second valve member on said casing.

3. A valve for controlling fluid flow in a conduit comprising,
   a wall-piece adapted to be mounted in the conduit substantially transversely to the direction of flow therethrough,
   first and second ports including valve seats formed in said wall-piece,
   a temperature-sensitive power unit including a pin member abutting said wall-piece and a casing exposed to the fluid and movable with respect to said pin member between retracted and extended positions in response to temperature ambient said casing,
   a first valve member fixedly connected to said casing and engageable with said first port valve seat only in the retracted position of said casing,
   first biasing means urging said casing toward its retracted position,
   a second valve member slidably carried on said casing and engageable with said second port valve seat,
   a second biasing means urging said second valve member toward said second port valve seat, and a pair of abutment surfaces formed respectively on said casing and on said second valve member and disposed in mutually spaced relation when said casing is in its retracted position and engageable with one another when said casing has moved a given distance toward its extended position to unseat said second valve member from said second port valve seat.

4. A waterline thermostat for controlling the unidirectional flow of fluid in a conduit comprising,
   a wall-piece mounted transversely within the conduit and having a flow port formed therethrough,
   a seating surface defining said flow port,
   a stirrup connected to said wall-piece and extending over said port,
   a temperature sensitive power unit having a casing and having a pin member extensible from said casing upon predetermined increases in a temperature ambient said casing,
   means mounting said pin member on said stirrup with said casing extending therefrom in an upstream direction,
   a by-pass port formed within said transverse wall-piece having a seat formed therearound,
   a valve member mounted on said casing and cooperable with said seat to control the fluid flow through said by-pass port,
   a main valve member slidably mounted on said casing and having cooperation with said seating surface to control fluid flow through said flow port,
   means biasing said casing and said main valve member in a downstream direction to seat said main valve member,
   a downstream-facing abutment lip formed on said main valve member, and
   an upstream-facing abutment surface formed on said casing downstream of said lip and engageable with said lip upon relative extensible movement between said pin member and said casing, wherein the distance between said first mentioned valve member and said abutment surface is always less than the distance between said seat and said lip.

5. A valve for controlling fluid flow in a conduit comprising, a wall-piece mounted in the conduit substantially transversely to the direction of flow therethrough, guide separation means connected to said wall-piece and forming separated first and second flow paths disposed upstream of said wall-piece, first and second port means including valve seats formed in said wall-piece in communication respectively with said flow paths to establish flow through said flow paths, a temperature-sensitive power unit having a central axis extending substantially parallel to the direction of flow and situated upstream of said wall-piece and including a pin member in abutting engagement with said wall-piece and a telescopically extensible casing having first and second interfacing abutment surfaces formed thereon and spaced axially with respect to one another, said casing having a portion exposed to fluid upstream of said flow paths and assuming a retracted position with respect to said pin member at relatively low temperatures ambient said exposed portion and movable in an upstream direction to assume an axially extended position at increased temperatures ambient said exposed portion, a first valve member fixedly mounted on said casing and engageable with the valve seat of said first port means in the contracted position of said casing to close said first flow path, a second valve member slidably carried on said casing and having first and second abutment surfaces spaced axially a given distance less than the spacing between said abutment surfaces of said casing and situated respectively axially between and in alignment with said abutment surfaces of said casing, biasing means interconnecting said casing and said wall-piece and biasing said casing axially in a downstream direction toward said retracted position, said first abutment surfaces of said casing and said second valve member being in abutting engagement when the casing is in said retracted position to dispose said second valve member in seating relation with the valve seat of said second port means whereby both said first and said second flow paths are closed in the retracted position of said casing, said casing being effective upon an increase in temperature ambient said exposed portion to move in an upstream direction from its retracted position to first open said first flow path and thereafter to open said second flow path upon further movement said given distance in an upstream direction.

6. A thermostatic valve for controlling fluid flow in a conduit comprising, a wall-piece mounted in the conduit substantially transversely to the direction of flow therethrough, a main valve seat and a by-pass valve seat formed in said wall-piece and defining respectively a main port and a by-pass port, a temperature sensitive power unit situated on the upstream side of said wall-piece and comprising a pin member in abutting engagement with said wall-piece and a casing extensibly movable with respect to said pin member between a retracted position and an extended position in response to temperature variations ambient said casing, biasing means interconnecting said power unit and said wall-piece urging said casing toward its retracted position, a by-pass valve member fixedly mounted on said casing and engageable with said by-pass port valve seat only in the retracted position of said casing, an upstream facing shoulder formed on said casing and movable therewith from a first position to a second position in a given path of travel upon movement of said casing between its retracted and its extended positions, a main valve assembly including a main valve member movably mounted on said wall-piece and engageable with said main port valve seat and biasing means urging said main valve member into engagement with said main port valve seat, and a downstream facing lip formed on said main valve member and situated in said given path of travel of said shoulder between said first and said second positions thereof to unseat said main valve member as said casing moves toward its extended position.

7. The thermostatic valve as defined in claim 6 wherein said by-pass port is smaller than said main port.

References Cited by the Examiner

UNITED STATES PATENTS

| | | | |
|---|---|---|---|
| 2,857,105 | 10/1958 | Drapeau | 236—34 |
| 2,873,070 | 2/1959 | Drapeau | 236—34 |
| 2,926,853 | 3/1960 | Wood | 236—34 |

EDWARD J. MICHAEL, *Primary Examiner.*